United States Patent
Ohno et al.

(10) Patent No.: US 9,944,246 B2
(45) Date of Patent: Apr. 17, 2018

(54) OCCUPANT PROTECTION DEVICE

(71) Applicant: TOYOTA JIDOSHA KABUSHIKI KAISHA, Toyota-shi, Aichi-ken (JP)

(72) Inventors: Mitsuyoshi Ohno, Miyoshi (JP); Yasushi Masuda, Kiyosu (JP); Shigeyuki Suzuki, Kiyosu (JP); Shinichi Ishida, Kiyosu (JP); Takenori Ozaki, Kiyosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/220,036

(22) Filed: Jul. 26, 2016

(65) Prior Publication Data

US 2017/0057456 A1    Mar. 2, 2017

(30) Foreign Application Priority Data

Aug. 25, 2015 (JP) ................................. 2015-166109

(51) Int. Cl.
  *B60R 21/231* (2011.01)
  *B60R 21/207* (2006.01)
  *B60R 21/00* (2006.01)

(52) U.S. Cl.
  CPC ...... *B60R 21/23138* (2013.01); *B60R 21/207* (2013.01); *B60R 21/231* (2013.01);
  (Continued)

(58) Field of Classification Search
  CPC .......... B60R 21/207; B60R 2021/2074; B60R 2021/2078; B60R 21/2072; B60R 21/214;
  (Continued)

(56) References Cited

U.S. PATENT DOCUMENTS 3,753,576 A * 8/1973 Gorman ................ B60R 21/207
                                                280/730.1
3,953,049 A * 4/1976 Surace ...................... B60R 21/08
                                                280/730.1
(Continued)

FOREIGN PATENT DOCUMENTS

DE       19859988 A1    6/2000
JP     2000-344044 A   12/2000
(Continued)

*Primary Examiner* — Paul N Dickson
*Assistant Examiner* — Timothy Wilhelm
(74) *Attorney, Agent, or Firm* — Oliff PLC

(57) ABSTRACT

An occupant protection device, including an airbag that is inflated and deployed on being supplied with gas, the airbag configuring an integral bag body including a front inflating portion that is inflated and deployed at a seat front side of the head of an occupant and that limits movement of the head toward a seat front side, and a pair of lateral inflating portions that are inflated and deployed at both seat width direction sides of the head of the occupant and that limit movement of the head toward a seat side, wherein an energy absorption amount with respect to displacement of the head by at least the lateral inflating portion, from out of the pair of lateral inflating portions, positioned at a vehicle width direction outside is greater than an energy absorption amount with respect to displacement of the head by the front inflating portion.

5 Claims, 6 Drawing Sheets

(52) U.S. Cl.
CPC ............. *B60R 2021/0048* (2013.01); *B60R 2021/2074* (2013.01); *B60R 2021/23146* (2013.01)

(58) Field of Classification Search
CPC .... B60R 2021/23308; B60R 21/23138; B60R 2021/23146
See application file for complete search history.

(56) References Cited

U.S. PATENT DOCUMENTS

| | | | | |
|---|---|---|---|---|
| 4,440,443 A * | 4/1984 | Nordskog | ............... | A47C 7/38 297/217.4 |
| 5,470,103 A * | 11/1995 | Vaillancourt | ......... | B60R 21/214 280/730.1 |
| 6,158,812 A * | 12/2000 | Bonke | ............ | B60N 2/4805 297/216.12 |
| 6,428,041 B1 * | 8/2002 | Wohllebe | ............ | B60R 21/2155 280/729 |
| 6,572,137 B2 * | 6/2003 | Bossecker | ............. | B60R 21/207 280/730.1 |
| 7,040,651 B2 * | 5/2006 | Bossecker | ......... | B60R 21/23138 280/729 |
| 7,445,284 B2 * | 11/2008 | Gerfast | ............... | B60N 2/4221 280/730.2 |
| 7,922,190 B2 * | 4/2011 | Sugimoto | ............. | B60R 21/207 280/729 |
| 8,579,321 B2 * | 11/2013 | Lee | ....................... | B60R 21/214 280/729 |
| 8,807,593 B2 * | 8/2014 | Lee | ....................... | B60R 21/213 280/730.1 |
| 9,156,426 B1 * | 10/2015 | Faruque | ............... | B60R 21/207 |
| 9,533,651 B1 * | 1/2017 | Ohno | ................ | B60R 21/23138 |
| 9,573,553 B2 * | 2/2017 | Ko | ........................ | B60R 21/233 |
| 2010/0237596 A1 * | 9/2010 | Sugimoto | ............. | B60R 21/207 280/743.1 |
| 2013/0015642 A1 * | 1/2013 | Islam | .................... | B60R 21/207 280/730.1 |
| 2013/0093224 A1 * | 4/2013 | Dainese | ................ | B60R 21/207 297/216.12 |
| 2014/0042733 A1 * | 2/2014 | Fukawatase | ...... | B60R 21/23138 280/730.2 |
| 2014/0327234 A1 * | 11/2014 | Heurlin | ................. | B60R 21/207 280/730.1 |
| 2016/0347272 A1 * | 12/2016 | Kato | ..................... | B60R 21/207 |
| 2017/0028955 A1 * | 2/2017 | Ohno | ................... | B60R 21/207 |
| 2017/0057459 A1 * | 3/2017 | Kondo | ................. | B60N 2/4606 |

FOREIGN PATENT DOCUMENTS

| | | |
|---|---|---|
| JP | 2007-230395 A | 9/2007 |
| JP | 2010-126141 A | 6/2010 |
| JP | 2013-018378 A | 1/2013 |

* cited by examiner

OCCUPANT PROTECTION DEVICE

CROSS-REFERENCE TO RELATED APPLICATION

This application is based on and claims priority under 35 USC 119 from Japanese Patent Application No. 2015-166109 filed on Aug. 25, 2015, the disclosure of which is incorporated by reference herein.

BACKGROUND

Technical Field

The present invention relates to an occupant protection device.

Related Art

Airbag devices are known in which a bag is inflated so as to surround an occupant from the front and both sides, by fixing a gas supply pipe with the bag attached to a seatback, and supplying gas from an inflator to the bag through the gas supply pipe during a collision (see Japanese Patent Application Laid-Open (JP-A) No, 2000-344044).

Airbag devices are also known in which head airbags are inflated toward the front from left and right end portions of a headrest of a seat and joined together in front of the head of the occupant, while an auxiliary head airbag is inflated toward the front from a center portion of the headrest of a seat and is joined to the pair of head airbags (see JP-A. No. 2013-018378).

In the configuration of JP-A No. 2000-344044, the gas supply pipe is provided projecting out above the seatback, and so the appearance is negatively affected and the gas supply pipe becomes an interference when the vehicle seat is operated. These issues are resolved by a configuration in which the head airbags are housed inside the headrest, as described in JP-A No. 2013-018378. However, in the configuration of JP-A No. 2013-018378, it is difficult to secure joint strength between the pair of head airbags that are joined together after inflation and deployment, and to secure joint strength of the auxiliary head airbag with respect to the pair of head airbags.

As a countermeasure thereto, it would be conceivable to adopt a configuration in which an airbag, housed inside the headrest or the seatback, is inflated and deployed as a bag body so as to surround the head of an occupant from the seat front side and both seat width direction sides. In such cases, considering positional relationships between the head of the occupant, and a windshield and a side window in the vicinity thereof, a sufficiently long stroke to absorb energy might not be secured, depending on the collision direction, and so there is room for improvement from the perspective of occupant head protection performance, taking different collision directions into consideration.

SUMMARY

In consideration of the above circumstances, an object of the present invention is to obtain an occupant protection device that is capable of achieving occupant protection performance in both frontal collisions and side-on collisions of a vehicle, in head airbags that are inflated and deployed as a bag body so as to surround the head of an occupant from the front and both sides.

An occupant protection device according to a first aspect of the present disclosure includes an airbag that is inflated and deployed from a state housed in a headrest or a seatback on being supplied with gas. The airbag configures an integral bag body including a front inflating portion that is inflated and deployed at a seat front side of the head of an occupant and that limits movement of the head toward a seat front side, and a pair of lateral inflating portions that are inflated and deployed at both seat width direction sides of the head of the occupant and that limit movement of the head toward a seat side. An energy absorption amount with respect to displacement of the head by at least the lateral inflating portion, from out of the pair of lateral inflating portions, positioned at a vehicle width direction outside is greater than an energy absorption amount with respect to displacement of the head by the front inflating portion.

In this occupant protection device, in a collision, the front inflating portion of the airbag is inflated and deployed at the seat front side of the head of the occupant, and the lateral inflating portions are inflated and deployed so as to sandwich the head of the occupant from the seat width direction outsides at both sides of the head. Thus, the head of the occupant is surrounded from the seat front side and both sides (on three sides) by the front inflating portion and the pair of lateral inflating portions.

During a frontal collision of the vehicle, for example, the head of the occupant attempting to move toward the vehicle front side under inertia contacts the front inflating portion of the airbag, and so movement toward the vehicle front side is limited. The front inflating portion is deformed and absorbs energy.

During a side-on collision of the vehicle, movement of the head of the occupant, attempting to move sideward toward a vehicle side under inertia, is limited by the respective lateral inflating portion of the airbag. The lateral inflating portion is deformed and absorbs energy. There is sometimes only a short distance between the head of the occupant and the vehicle body provided at the seat side, such that sufficient energy absorption stroke cannot be secured when this occurs. Note that the occupant protection device of the present disclosure is set such that the energy absorption amount of at least the vehicle width direction outside lateral inflating portion with respect to displacement of the head increased. This enables the energy absorption amount by this lateral inflating portion to be increased, even with a short stroke. This enables the difference in energy absorption amounts due to different collision directions to be reduced.

An occupant protection device of a second aspect of the present disclosure has the configuration of the first aspect, wherein on inflation and deployment of the airbag, a maximum thickness in the seat width direction of at least the vehicle width direction outside lateral inflating portion facing the head of the occupant is thicker than a maximum thickness in a seat front-rear direction of the front inflating portion facing the head of the occupant.

In the second aspect of the present disclosure, the maximum thickness in the seat width direction of at least the vehicle width direction outside lateral inflating portion is thicker than the maximum thickness in the seat front-rear direction of the front inflating portion. Thus, there is a shorter distance between the head of the occupant and the lateral inflating portion, the head of the occupant and the lateral inflating portion soon contact each other, such that energy absorption starts directly after a side-on collision, thereby enabling sufficient energy absorption stroke to be secured. This enables the energy absorption amount by the lateral inflating portion in a side-on collision to be increased, and enables the difference in the energy absorption amounts according to different collision directions to be reduced.

An occupant protection device according to a third aspect of the present disclosure has the configuration of the first or the second aspect, wherein on inflation and deployment of the airbag, an internal pressure of at least the vehicle width direction outside lateral inflating portion is higher than an internal pressure of the front inflating portion.

The third, aspect of the present disclosure enables a high reaction force to be output with respect to the head of the occupant due to at least the vehicle width direction outside lateral inflating portion having a higher internal pressure than the front inflating portion. This enables the energy absorption amount to be increased, even in cases in which there is a short stroke, thereby enabling the difference in energy absorption amounts according to different collision directions to be reduced.

An occupant protection device according to a fourth aspect of the present disclosure has the configuration of any one of the first to the third aspect, wherein a diffuser that distributes gas such that a gas supply amount to at least the vehicle width direction outside lateral inflating portion is greater than a gas supply amount to the front inflating portion is provided between the airbag and an inflator that supplies gas to the airbag.

The fourth aspect of the present disclosure enables gas to be appropriately distributed to plural inflating portions from a single inflator, due to providing the diffuser between the inflator and the airbag.

An occupant protection device according to a fifth aspect of the present disclosure has the configuration of the fourth aspect, wherein the diffuser includes a first gas supply port that is connected to the front inflating portion and supplies gas to the front inflating portion, and a second gas supply port that is connected to the lateral inflating portions and supplies gas to the lateral inflating portions, and that is set with a larger opening area than the first gas supply port.

In the fifth aspect of the present disclosure, plural gas supply ports are provided to the diffuser, and the second gas supply port is set with a larger opening area than the first gas supply port. Differing the opening areas of the gas supply ports of the diffuser in this manner enables the gas supply amount to be appropriately adjusted using a simple configuration.

As explained above, the occupant protection device according to the present disclosure achieves excellent advantageous effects of enabling the difference in occupant head protection performance according to different collision directions to be reduced, and enabling head protection performance to be improved, in airbags that are configured as an integral bag body to protect the head of the occupant.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding an occupant protection device 10 according to a first exemplary embodiment of the present disclosure, based on FIGS. 1 to 4B. In each of the drawings as appropriate, the arrow FR and the arrow UP respectively indicate the front direction (the direction a seated occupant faces) and upper direction of a vehicle seat 12. Unless specifically stated otherwise, simple reference to the front and rear, up and down, and left and right directions refers to front and rear in the seat front-rear direction, up and down in the seat up-down direction, and left and right when facing the front in the seat front-rear direction. In each of the drawings as appropriate, the arrow IN indicates the vehicle center side in the vehicle width direction of an automobile serving as a vehicle installed with the vehicle seat 12.

Note that FIG. 1 and so on illustrate a crash test dummy (doll) D, serving as a model of an occupant to be protected, in a seated state on a seat cushion 14, described later, of the vehicle seat 12. The dummy D is, for example, a World Side Impact Dummy (World SID) of a 50th percentile American adult male (AM50). The dummy D is seated in a standard seated posture specified in crash testing methods, and the vehicle seat 12 is positioned in a reference setting position corresponding to the seated posture. In the interests of simplicity of explanation, the dummy D is hereafter referred to as "seated occupant D".

Overall Schematic Configuration of Occupant Protection Device

Figure 1:
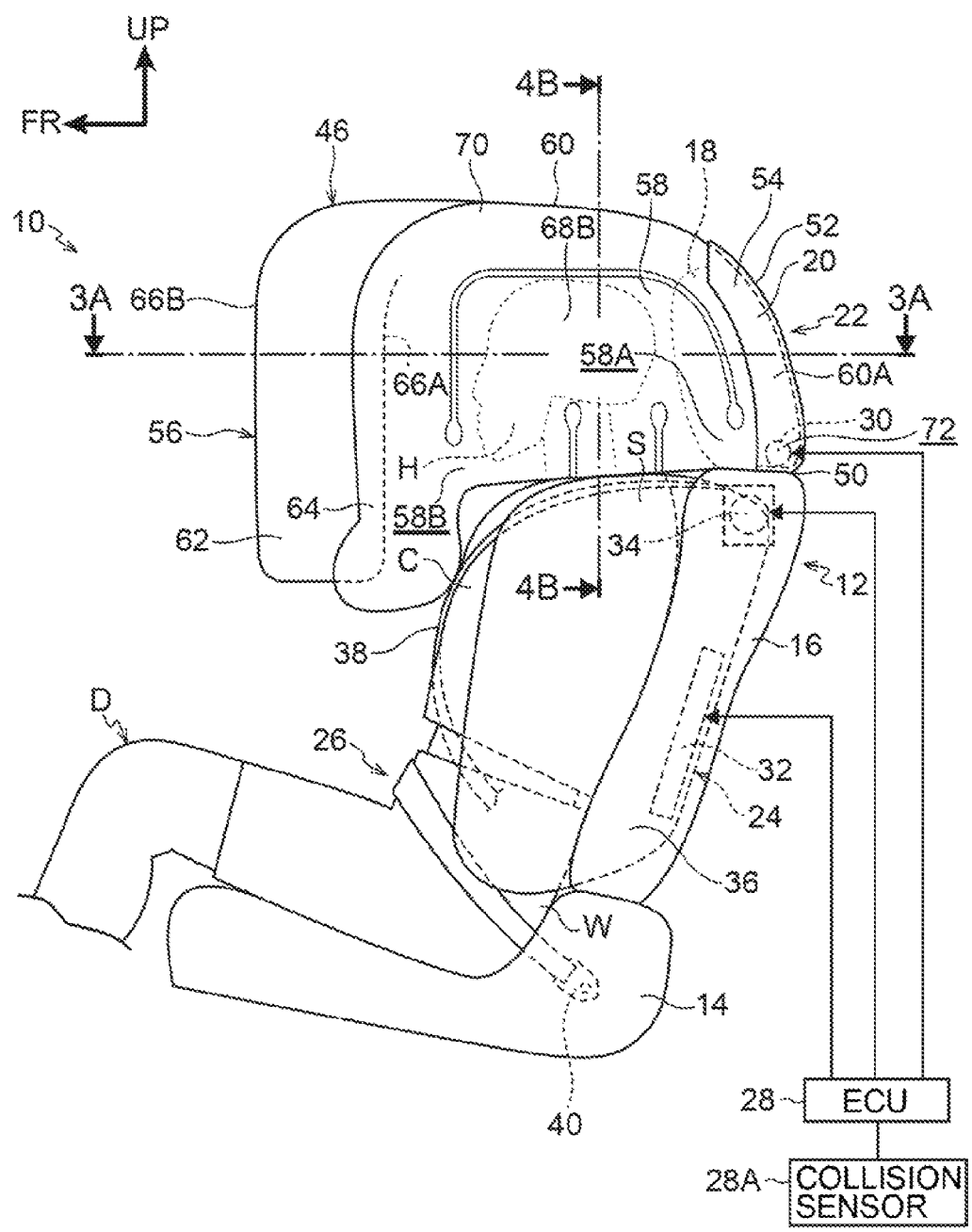
FIG. 1 is a side view schematically illustrating a protection mode of a seated occupant by an occupant protection device according to a first exemplary embodiment of the present disclosure.
Figure 2:
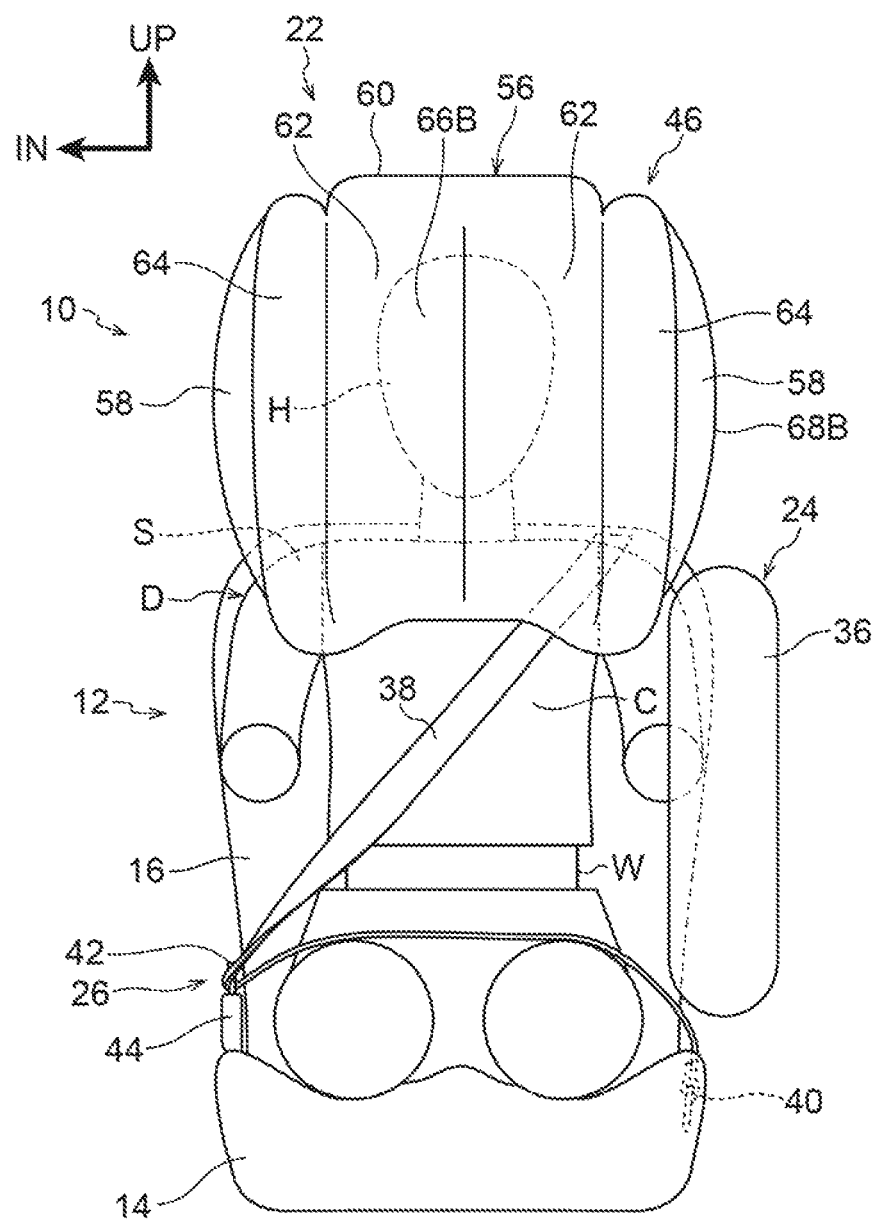
FIG. 2 is a face-on view schematically illustrating a protection mode of a seated occupant by an occupant protection device according to the first exemplary embodiment of the present disclosure.
Figure 3:
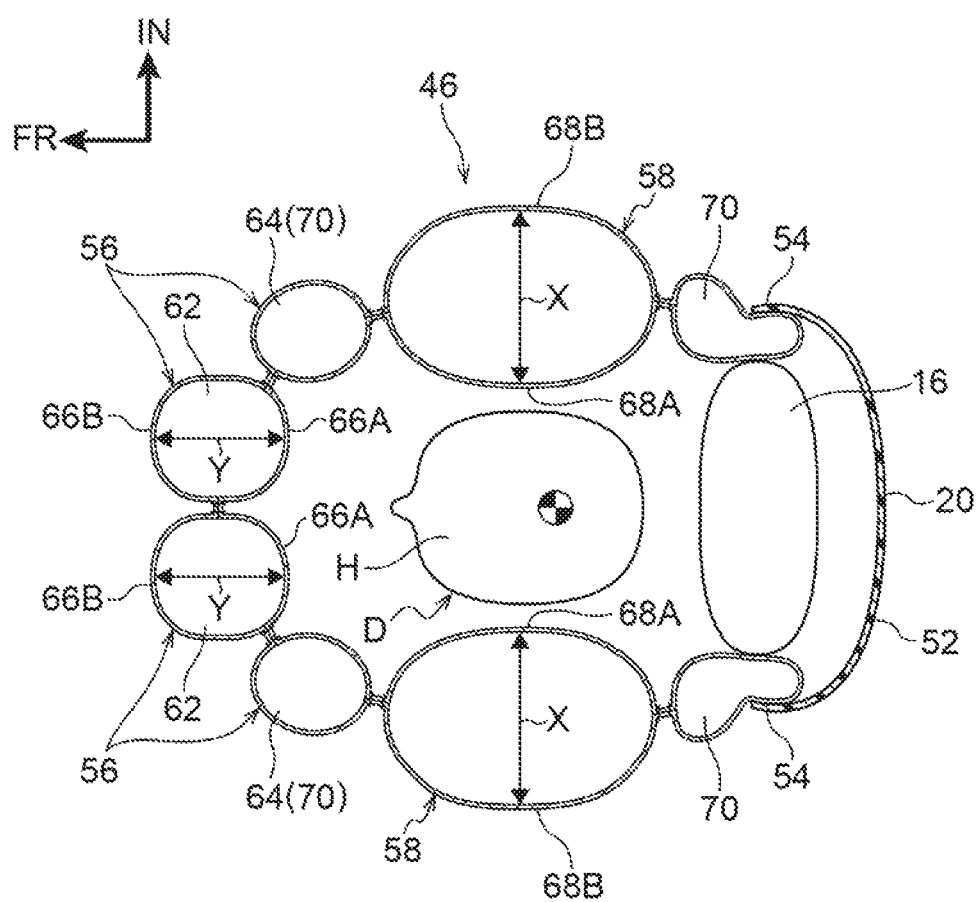
FIG. 3 is a cross-section taken along line 3A-3A in FIG. 1, illustrating an inflated and deployed state of a multidirectional airbag configuring an occupant protection device according to the first exemplary embodiment of the present disclosure.

As illustrated in FIG. 1, the occupant protection device 10 is installed in the vehicle seat 12. The vehicle seat 12 is offset to either the left or right (the left side in the present exemplary embodiment) of the vehicle width direction center of a vehicle body of the automobile, not illustrated in the drawings, and is disposed such that the seated occupant D seated in the seat cushion 14 faces the vehicle front-rear direction front side.

Seat

The vehicle seat 12 is configured including a seatback 16 that has a lower end coupled to a rear end of the seat cushion 14, and a headrest 18 provided at an upper end of the seatback 16. The headrest 18 is attached to the seatback 16 by a headrest stay, not illustrated in the drawings. A module case 20 (described later), functioning as a back board configuring a rear design portion of the headrest 18, is provided at the seat rear side of the headrest 18.

Occupant Protection Device

The occupant protection device is configured including a multidirectional airbag device 22, a side airbag device 24, and a seatbelt device 26 for protecting the seated occupant D in a collision. These devices are actuated when a collision has been detected or predicted by an ECU 28, and function so as to protect the occupant. Detailed explanation follows regarding each of these devices.

ECU

The multidirectional airbag device 22, the side airbag device 24, and the seatbelt device 26 configuring the occupant protection device 10 are controlled by the ECU 28 serving as a controller. Specifically, an inflator 30 of the multidirectional airbag device 22, an inflator 32 of the side airbag device 24, and a retractor 34 (pre-tensioning function) of the seatbelt device 26 are each electrically connected to the ECU 28. The ECU 28 is electrically connected to a collision sensor 28A (or sensor group).

The ECU 28 is capable of detecting or predicting (the occurrence or inevitability of) a frontal collision or a side-on collision of the automobile to which it is applied based on data from the collision sensor 28A. When the ECU 28 detects or predicts a side-on collision based on data from the collision sensor 28A, the ECU 28 actuates the inflators 30, 32. When the ECU 28 detects or predicts a frontal collision based on data from the collision sensor 28A, the ECU 28 actuates the inflator 30 and the retractor 34. Note that when an oblique collision or a small overlap collision has been detected or predicted, the inflators 30, 32 and the retractor 34 are actuated.

Seatbelt Device

The seatbelt device 26 is a three-point type seatbelt device, with one end of a belt 38 taken up on the retractor 34 so as to be capable of being pulled out therefrom, and another end of the belt 38 fixed to an anchor 40. A tongue plate 42 is provided so as to be capable of sliding along the belt 38, and the belt 38 is worn by the seated occupant D by anchoring the tongue plate 42 in a buckle 44. The upper body of the seated occupant D is restrained in the vehicle seat 12, particularly due to the belt 38 being worn from the waist W to the shoulders S of the seated occupant D.

Note that in the present exemplary embodiment, the retractor 34, the anchor 40, and the buckle 44 configuring the seatbelt device 26 are provided to the vehicle seat 12. In the present exemplary embodiment, the retractor 34 has a pre-tensioning function on actuation, in which the belt 38 is forcibly taken up. Namely, the seated occupant D can be restrained in the vehicle seat 12 due to the retractor 34 taking up the belt 38 when a collision has been predicted or detected by the ECU 28, described later.

Side Airbag Device

The side airbag device 24 is configured including the inflator 32 and a side airbag 36. The inflator 32 is provided inside the seatback 16 and is connected to the side airbag 36. The side airbag 36 is folded and housed in a side section at the vehicle width direction outside of the seatback 16. The inflator 32 is actuated when the ECU 28 detects or predicts a collision. Configuration is such that gas is generated inside the side airbag 36, the side airbag 36 projects out forward from the side section of the seatback 16, and is inflated and deployed at the vehicle width direction outside of the seated occupant D, more specifically, at the vehicle width direction outside of the waist W, chest C, and shoulders S of the seated occupant D.

Multidirectional Airbag Device

The multidirectional airbag device 22 is configured including a multidirectional airbag 46, the inflator 30 that supplies gas to the multidirectional airbag 46, and the module case 20 in which the multidirectional airbag 46 is housed. More detailed explanation follows regarding their respective configurations.

Module Case

The module case 20 is provided at the vehicle rear side of the headrest 18, and is a back board configuring the rear design portion of the headrest 18. Thus, the multidirectional airbag 46 is installed inside (at the interior of) a rear portion of the headrest 18. Prior to inflation and deployment, the multidirectional airbag 46 is folded and housed inside the module case 20.

The module case 20 is configured with a base portion 50, a main wall 52 serving as a rear wall, and a left and right pair of side walls 54 as relevant portions. The base portion 50 is a fixing portion to the upper end of the seatback 16. The main wall 52 extends out upward from a rear end of the base portion 50, projects out further upward than the upper end of the headrest 18 in face-on view, and juts out at both seat width direction sides of the headrest 18. A space for housing the multidirectional airbag 46 in a folded state is formed between the main wall 52 and the headrest 18.

Inflator

A combustion type or cold gas type of inflator is employed as the inflator 30. Gas generated on actuating the inflator 30 is supplied into the multidirectional airbag 46. In the present exemplary embodiment, the inflator 30 is a cylinder type inflator, and is installed with its length direction along the seat width direction inside the headrest 18. Actuation of the inflator 30 is controlled by the ECU 28, described later, serving as a controller.

Note that configuration may be such that two inflators 32 are provided. The two inflators 30 may be disposed side-by-side in the seat width direction such that respective gas ejection ports 72 face the seat width direction outsides, with one inflator 30 connected to lateral inflating portions 58, described later, and the other inflator 30 connected to a front inflating portion 56, described later. Gas can thereby be supplied to the lateral inflating portions 58 and the front inflating portion 56

Multidirectional Airbag

The multidirectional airbag 46 is configured as an integral bag body that is inflated and deployed so as to surround the head H of the seated occupant from the front, upper side, and both left and right sides. More specifically, the multidirectional airbag 46 includes the front inflating portion 56 that is inflated and deployed toward a position in front of the head H, a left and right pair of lateral inflating portions 58 that are inflated and deployed toward positions at both sides of the head H, and an upper deployment portion 60 that is deployed above the head H. Respective upper edges of the front inflating portion 56 and the left and right pair of lateral inflating portions 58 are linked to the upper deployment portion 60. Namely, the multidirectional airbag 46 is a bag body that covers the head H of the seated occupant D from above.

Front Inflating Portion

The front inflating portion 56 receives gas supplied from the inflator 30 through ducts 70 of the upper deployment portion 60, described later, and is inflated and deployed at the vehicle front side of the head H of the seated occupant D. The front inflating portion 56 is configured including a left and right pair of main inflating portions 62 that face the head H of the seated occupant D and are adjacent to each other in the seat width direction, and a left and right pair of auxiliary inflating portions 64 that are provided further toward the seat width direction outsides than the main inflating portions 62. An inside face 66A of each main inflating portion 62 is inflated and deployed facing the head H, and an outside face 66B of each main inflating portion 62 is inflated and deployed facing a windshield FW.

Lateral Inflating Portions

A communicating portion 58A at a rear end, and a communicating portion 58B at a front end, of each lateral inflating portion 58 are connected to the respective duct 70, and the lateral inflating portions 58 are inflated and deployed at both left and right sides of the head H of the seated occupant D on receiving gas supplied from the inflator 30. An inside face 68A of each lateral inflating portion 58 is inflated and deployed facing the head H of the seated occupant D, and an outside face 68B of each lateral inflating portion 58 is inflated and deployed facing a side window SW. In the present exemplary embodiment, a maximum thickness X of each lateral inflating portion 58 in the seat width direction (a distance between the inside face 68A and the outside face 68B) is set larger than a maximum thickness Y of the front inflating portion 56 in the seat from-rear direction (a distance between each inside face 66A and the respective outside face 66B).

Upper Deployment Portion

The upper deployment portion 60 is deployed above the head H of the seated occupant D on being supplied with gas. A rear end 60A of the upper deployment portion 60 is connected to the inflator 30, and the upper deployment portion 60 is linked to the respective upper edges of the front inflating portion 56 and the left and right pair of lateral inflating portions 58. The ducts 70 are provided extending along the front-rear direction in the upper deployment portion 60, and gas supplied from the inflator 30 is conveyed to the front inflating portion 56 through the ducts 70.

Explanation follows regarding operation and advantageous effects of the first exemplary embodiment.

When the ECU 28 detects or predicts a frontal collision based on data from the collision sensor 28A. the ECU 28 actuates the retractor 34 of the seatbelt device 26 and the inflator 30 of the multidirectional airbag 46. Thus, the belt 38 is forcibly taken up by the retractor 34, and the multidirectional airbag 46 is inflated and deployed so as to surround the head H of the seated occupant D.

Figure 4A:
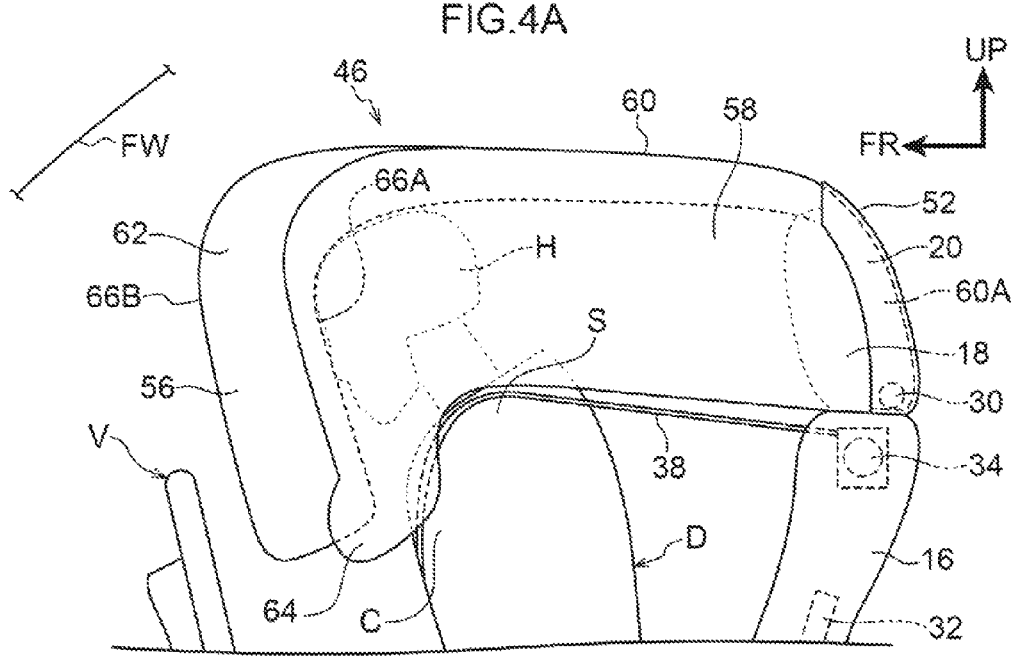
FIG. 4A is a side view corresponding to FIG. 1, illustrating a protection mode of a seated occupant by an occupant protection device according to the first exemplary embodiment of the present disclosure during a vehicle frontal collision.

In cases of a frontal collision, as illustrated in FIG. 4A, the seated occupant D moves under inertia toward the seat front side. The seated occupant D wearing the belt 38 of the seatbelt device 26 adopts a posture in which the upper body of the seated occupant D tilts forward about the waist W. When this occurs, the head H contacts the front inflating portion 56 of the multidirectional airbag 46 while the seated occupant D is being restrained by the belt 38, and movement of the head H toward the seat front side is limited by the front inflating portion 56. The front inflating portion 56 is deformed due to contact with the head H, and absorbs energy.

In an initial state prior to a collision, the head H of the seated occupant D seated in the seat cushion 14 is in a position that is relatively separated from a vehicle configuration component V (such as an instrument panel or a steering wheel) at the seat front side. This enables a long energy absorption stroke to be secured when the collision has occurred, enabling an energy absorption amount to be increased.

In contrast thereto, in cases of a side-on collision, when the ECU 28 detects or predicts a side-on collision based on information from the collision sensor 28A, the ECU 28 actuates the inflator 32 of the side airbag device 24 and the inflator 30 of the multidirectional airbag device 22. Thus, the side airbag 36 is inflated and deployed at the vehicle width direction outside of the seated occupant D, and the multidirectional airbag 46 is inflated and deployed so as to surround the head H of the seated occupant D.

Figure 4B:
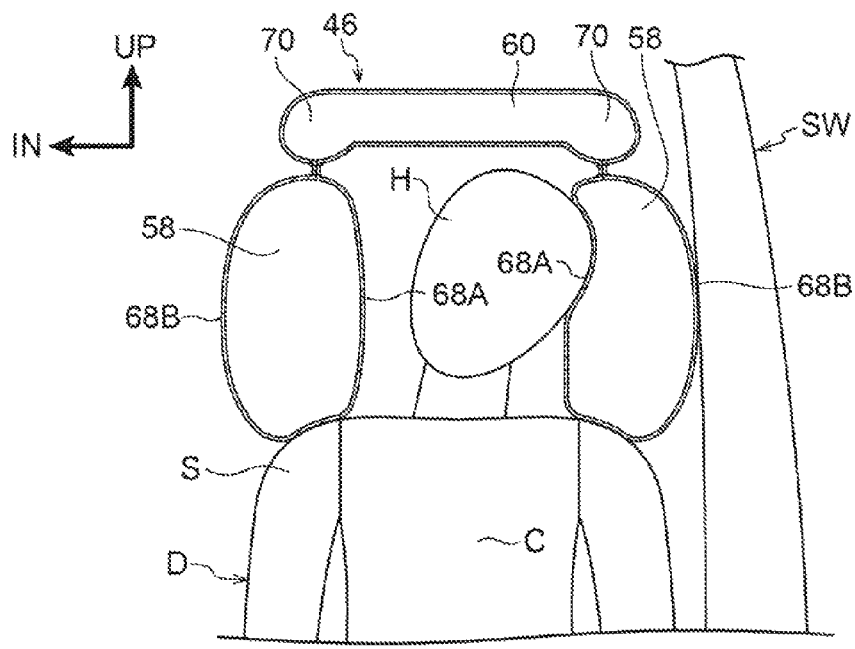
FIG. 4B is a cross-section taken along line 4B-4B in FIG. 1, illustrating a protection mode of at seated occupant by an occupant protection device according to the first exemplary embodiment of the present disclosure during a vehicle side-on collision.

When a side-on collision has occurred, as illustrated in FIG. 4B, the seated occupant D moves sideward under inertia toward a side of the seat. When this occurs, the side airbag 36 is inflated and deployed, and sideward movement of the waist W, chest C, and shoulders S of the seated occupant D toward the vehicle side is restricted. Sideward movement of the head H of the seated occupant D toward the vehicle side is limited by the respective lateral inflating portion 58 of the multidirectional airbag 46. The lateral inflating portion 58 deforms on contact with the head H, absorbing energy. Note that the side airbag 36 is not illustrated in FIG. 4B.

In the initial state prior to a collision, there is only a short sideward spacing between the head H of the seated occupant D and the side window SW at the seat side, such that a long energy absorption stroke cannot be secured, unlike in a frontal collision. However, in the present exemplary embodiment, the maximum thickness X in the seat width direction of the lateral inflating portion 58 facing the head H of the seated occupant D is thicker than the maximum thickness Y in the seat front-rear direction of the front inflating portion 56 facing the head H of the seated occupant D. Thus, the head H of the seated occupant D contacts the respective lateral inflating portion 58 soon after starting to move sideward toward the vehicle side. Thus, reaction force starts to be applied to the head H earlier, and the spacing in which energy is absorbed while the lateral inflating portion 58 is deformed becomes longer, thereby enabling the energy absorption amount to be increased. This enables a difference between energy absorption amounts during a frontal collision and a side-on collision to be reduced.

Second Exemplary Embodiment

Figure 5:
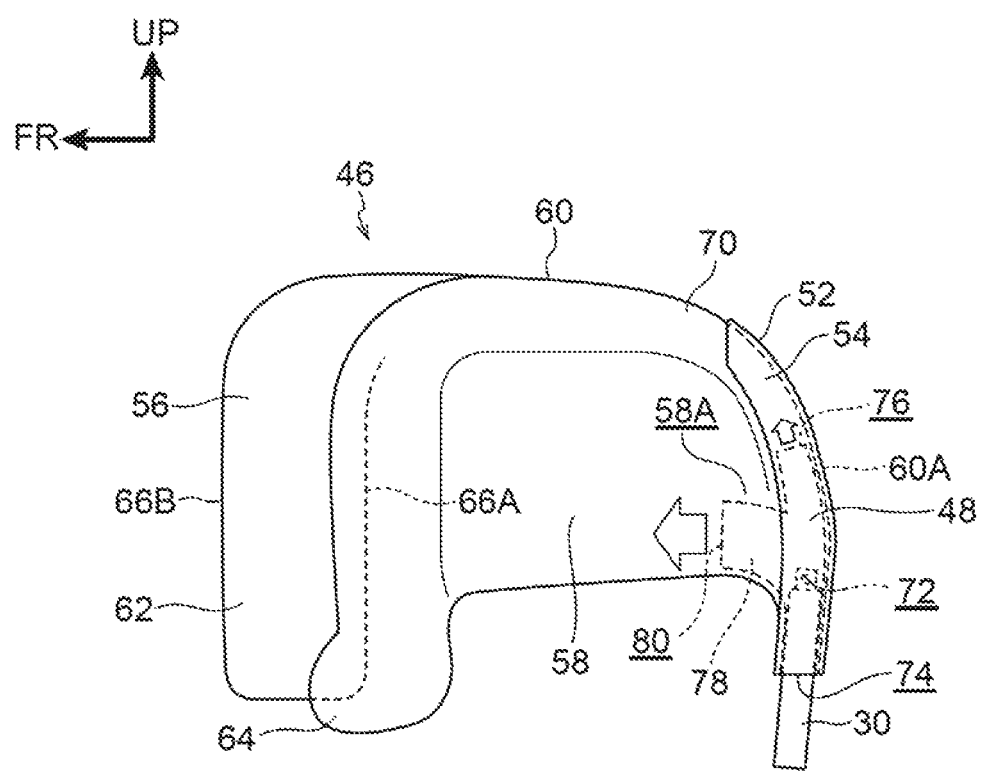
FIG. 5 is a side view of a multidirectional airbag including a diffuser, configuring an occupant protection device according to a second exemplary embodiment of the present disclosure.

Explanation follows regarding a second exemplary embodiment of the present disclosure, with reference to FIG. 5. Note that configuration and operation that are basically the same as those in the first exemplary embodiment are appended with the same reference numerals as in the first exemplary embodiment, and explanation or illustration thereof is sometimes omitted.

Similarly to in the first exemplary embodiment, the multidirectional airbag 46 is configured including the front inflating portion 56 and the lateral inflating portions 58. In the present exemplary embodiment, the headrest 18 is integrally provided to the seatback 16, and the inflator 30 is installed with its length direction along the seat up-down direction at the side section of the seatback 16. A diffuser 48 is provided between the inflator 30, and the front inflating portion 56 and the lateral inflating portions 58, and the diffuser 48 distributes gas supplied from the inflator 30 to the front inflating portion 56 and the lateral inflating portions 58.

The diffuser 48 is made of cloth, with a leading end formed into a substantially tube shape divided into three prongs, and a gas inflow port 74 provided at one end connected to inflator 30 including the gas ejection port 72. A first gas supply port 76 that supplies gas to the front inflating portion 56 is provided at another end of the diffuser 48. The first gas supply port 76 is connected to the rear end 60A of the upper deployment portion 60, and configuration is such that gas is supplied to the front inflating portion 56 through the upper deployment portion 60. A left and right pair of branched portions 78 are provided to a length direction portion of the diffuser 48. A second gas supply port 80 that supplies gas to the respective lateral inflating portion 58 is formed at a leading end of each branched portion 78. The second gas supply port 80 is connected to the communicating portion 58A at the rear end of the respective lateral inflating portion 58. Each second gas supply port 80 is set with a larger opening area than the first gas supply port 76. Thus, the diffuser 48 supplies more gas to the lateral inflating portions 58 than to the front inflating portion 56, such that an internal pressure of the lateral inflating portions 58 is set higher than an internal pressure of the front inflating portion 56. In other words, the gas supply amount per volume to each lateral inflating portion 58 is greater than the gas supply amount per volume to the front inflating portion 56.

In the present exemplary embodiment, making the internal pressure of the lateral inflating portions 58 higher than the internal pressure of the front inflating portion 56 enables reaction force to be increased when the head H of the seated occupant D has contacted the respective lateral inflating portion 58. This enables an initial load to be raised, enabling the energy absorption amount to be increased, even in cases in which there is only a short spacing to a vehicle body side section. This enables a difference between the energy absorption amount by the front inflating portion 56 and the energy absorption amount by the respective lateral inflating portion 58 to be reduced. The present exemplary embodiment enables the energy absorption amount of the respective lateral inflating portion to be increased without changing the size of the lateral inflating portion, in cases in which the thickness of the lateral inflating portion cannot be made thicker due to a space-related issue, for example. Note that it is also possible to make the thickness of the lateral inflating portion 58 thicker in addition to increasing the internal pressure of the respective lateral inflating portion 58, thereby further improving the energy absorption performance of the lateral inflating portion 58.

Modified Examples

Explanation follows regarding modified examples. Note that configuration and operation that are basically the same as those in the first exemplary embodiment are appended with the same reference numerals as in the first exemplary embodiment, and explanation or illustration thereof is sometimes omitted.

Figure 6A:
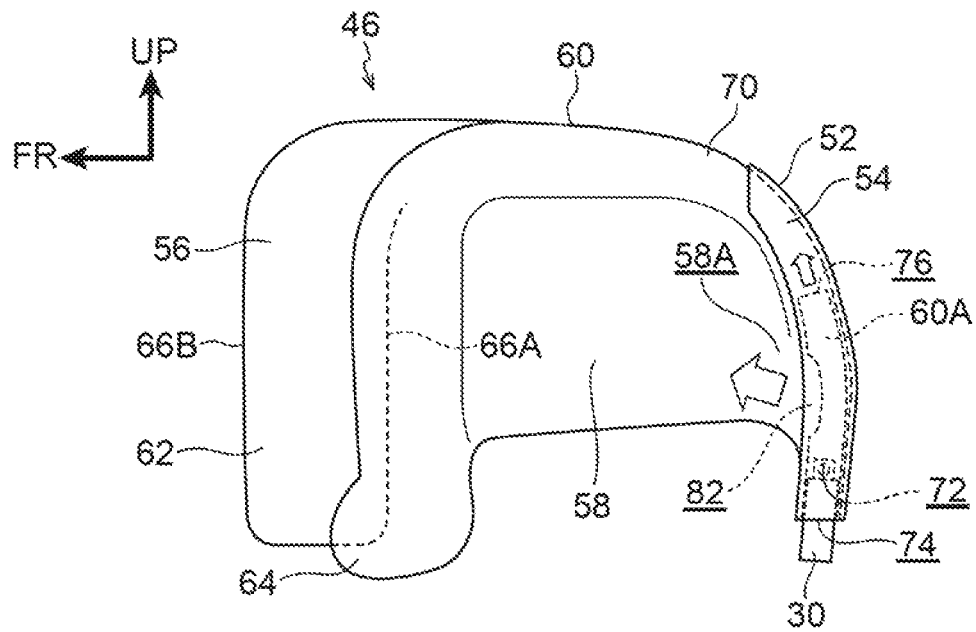
FIG. 6A is a side view of a modified example 1, illustrating a multidirectional airbag including a diffuser, configuring an occupant protection device according to a modified example of the present disclosure.

As illustrated in FIG. 6A, in a modified example 1, the gas inflow port 74 provided to the one end of the diffuser 48 is connected to the inflator 30 including the gas ejection port 72, and the first gas supply port 76 provided to the other end of the diffuser 48 is connected to the rear end 60A of the upper deployment portion, such that gas is supplied to the front inflating portion 56. Opening portions 82, serving as a second gas supply portion, are provided at a length direction portion of the diffuser 48. The opening portions 82 are open toward the inside of the respective lateral inflating portions 58, and are each set with a larger opening area than the first gas supply port 76.

In the modified example 1, some of the gas ejected from the inflator 30 is supplied to the lateral inflating portions 58 through the opening portions 82, and the remaining gas is supplied to the front inflating portion 56 through the first gas supply port 76. This enables gas to be distributed and the gas supply amount to the front inflating portion 56 and the lateral inflating portions 58 to be adjusted using a simpler configuration than in cases in which branched portions are formed in the diffuser 48.

Figure 6B:
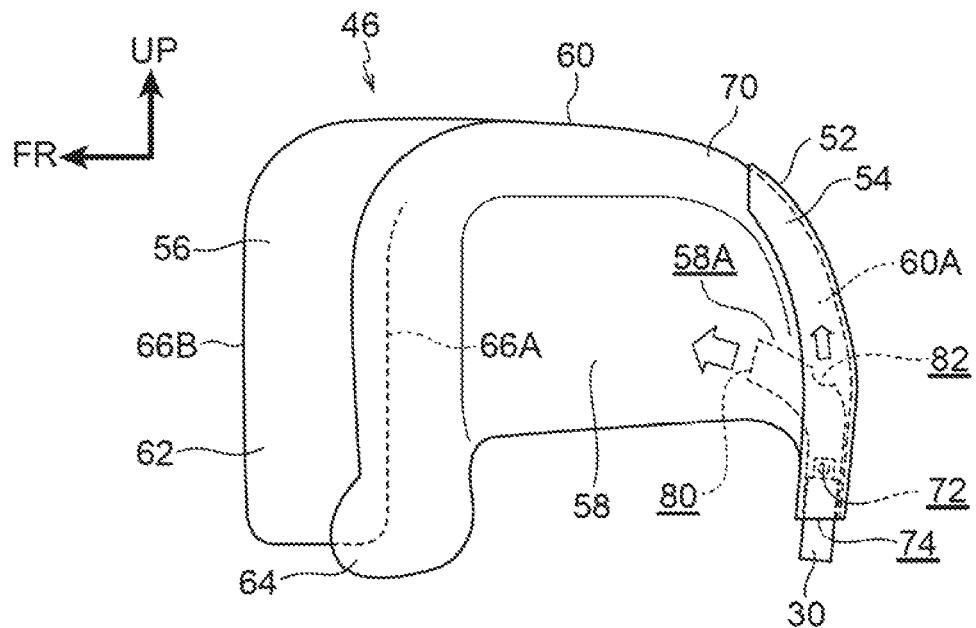
FIG. 6B is a side view of a modified example 2, illustrating a multidirectional airbag including a diffuser, configuring an occupant protection device according to a modified example of the present disclosure.

As illustrated in FIG. 6B, in a modified example 2, configuration may be such that the gas inflow port 74 provided at the one end of the diffuser 48 is connected to the inflator 30 including the gas ejection port 72, the second gas supply port 80 provided at the other end of the diffuser 48 is connected to the lateral inflating portions 58, and the opening portion 82, serving as a first gas supply port provided at a length direction portion of the diffuser 48, is open toward the inside of the upper deployment portion 60. In such cases, the opening area of the opening portion 82 is smaller than the opening area of the second gas supply port 80. This enables the supply amounts of gas to the front inflating portion 56 and the lateral inflating portions 58 to be adjusted.

Supplementary Explanation of Above Exemplary Embodiments

In the multidirectional airbag 46 explained in the above exemplary embodiments, the left and right pair of lateral inflating portions 58 each have the same energy absorption amounts; however, it is sufficient that, of the pair of lateral inflating portions 58, at least the lateral inflating portion 58 positioned at the vehicle width direction outside has an energy absorption amount that is larger than the energy absorption amount of the front inflating portion 56. Namely, in cases in which the energy absorption amount of the lateral inflating portion 58 at the vehicle width direction outside is greater than the energy absorption amount of the front inflating portion 56, and the energy absorption amount of the lateral inflating portion 58 at the vehicle width direction inside is less than the energy absorption amount of the front inflating portion 56, the impact borne by the head H of the seated occupant D from a vehicle body V (specifically, the side window) can be alleviated.

Note that in cases in which the energy absorption amounts of the lateral inflating portions 58 are the same for the left and right pair of lateral inflating portions 58, head protection performance during a side-on collision can be secured when rotatable seats, these being seats that are capable of changing seat orientation, have been rotated (to face each other). By making the maximum thickness X in the seat width direction of each lateral inflating portion 58 the same for the left and right pair of lateral inflating portions 58, namely, by configuring the multidirectional airbag 46 in a shape with left-right symmetry, the deployment behavior of the multidirectional airbag can be stabilized.

What is claimed is:

1. An occupant protection device, comprising:
an airbag that is configured to be inflated and deployed from a state housed in a headrest or a seatback on being supplied with gas, the airbag configuring an integral bag body including
a front inflating portion that is configured to be inflated and deployed at a seat front side of the head of an occupant and that is configured to limit movement of the head toward a seat front side, and
a pair of lateral inflating portions that are configured to be inflated and deployed at both seat width direction sides of the head of the occupant and that are configured to limit movement of the head toward a seat side, wherein
an energy absorption amount with respect to displacement of the head by at least the lateral inflating portion in a case of a side-on collision, from out of the pair of lateral inflating portions, positioned at a vehicle width direction outside is greater than an energy absorption amount with respect to displacement of the head by the front inflating portion in a case of a frontal collision.

2. The occupant protection device of claim 1, wherein
on inflation and deployment of the airbag, a maximum thickness in the seat width direction of at least the vehicle width direction outside lateral inflating portion that is configured to face the head of the occupant is thicker than a maximum thickness in a seat front-rear direction of the front inflating portion that is configured to face the head of the occupant.

3. The occupant protection device of claim 1, wherein
on inflation and deployment of the airbag, an internal pressure of at least the vehicle width direction outside lateral inflating portion is higher than an internal pressure of the front inflating portion.

4. The occupant protection device of claim 1, wherein
a diffuser that distributes gas such that a gas supply amount to at least the vehicle width direction outside lateral inflating portion is greater than a gas supply amount to the front inflating portion is provided between the airbag and an inflator that supplies gas to the airbag.

5. The occupant protection device of claim 4, wherein the diffuser includes:
- a first gas supply port that is connected to the front inflating portion and supplies gas to the front inflating portion; and
- a second gas supply port that is connected to the lateral inflating portions and supplies gas to the lateral inflating portions, and that is set with a larger opening area than the first gas supply port.

* * * * *